Dec. 4, 1923.

R. S. BLAIR

FENDER FOR VEHICLES

Filed April 19, 1921

1,476,039

2 Sheets-Sheet 1

INVENTOR
Robert S. Blair

Dec. 4, 1923.

R. S. BLAIR 1,476,039

FENDER FOR VEHICLES

Filed April 19, 1921

2 Sheets-Sheet 2

INVENTOR

Robert S. Blair

Patented Dec. 4, 1923.

1,476,039

UNITED STATES PATENT OFFICE.

ROBERT S. BLAIR, OF SOUND BEACH, CONNECTICUT.

FENDER FOR VEHICLES.

Application filed April 19, 1921. Serial No. 462,581.

*To all whom it may concern:*

Be it known that I, ROBERT S. BLAIR, citizen of the United States, and resident of Sound Beach, in the county of Fairfield and State of Connecticut, have invented certain new and useful Improvements in Fenders for Vehicles, of which the following is a specification.

This invention relates to fenders for vehicles and with regard to certain features more particularly to fenders for motor vehicles.

One of the objects thereof is to provide a fender of simple and practical construction and efficient in operation. Another object is to provide a fender which will not rattle during the operation of the vehicle to which it is attached on rough roads. Another object is to provide a fender positively actuated. Another object is to provide a fender which can be quickly and efficiently operated by the average vehicle operator. Another object is to provide a fender which can be readily attached by the average mechanic to any of the existing standard vehicles. Other objects will be in part obvious and in part pointed out hereinafter.

The invention accordingly consists in the features of construction, combinations of elements and arrangements of parts which will be exemplified in the structure hereinafter described and the scope of the application of which will be indicated in the following claims.

Figure 1:
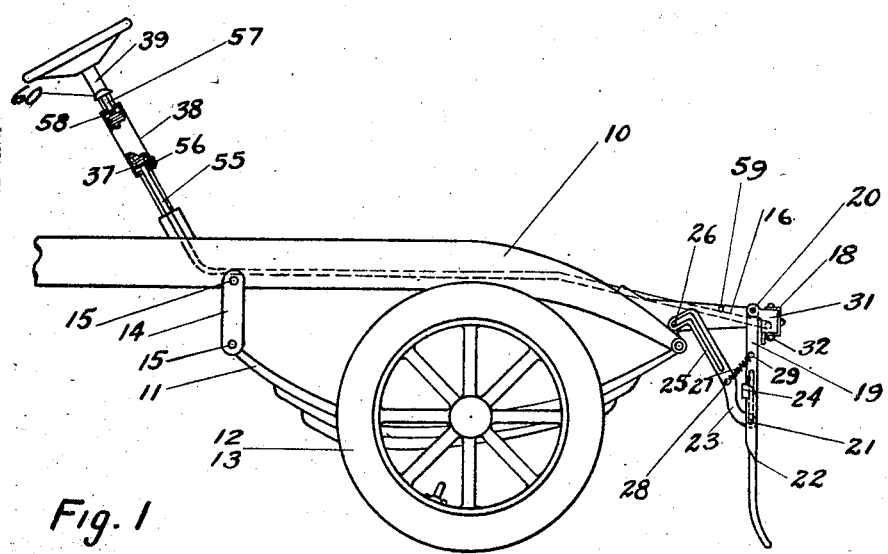
Figure 2:
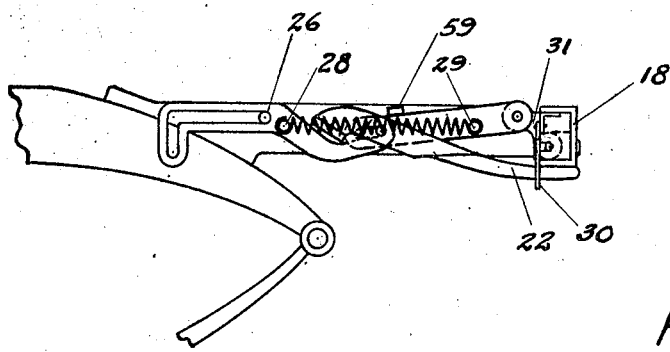
Figure 3:
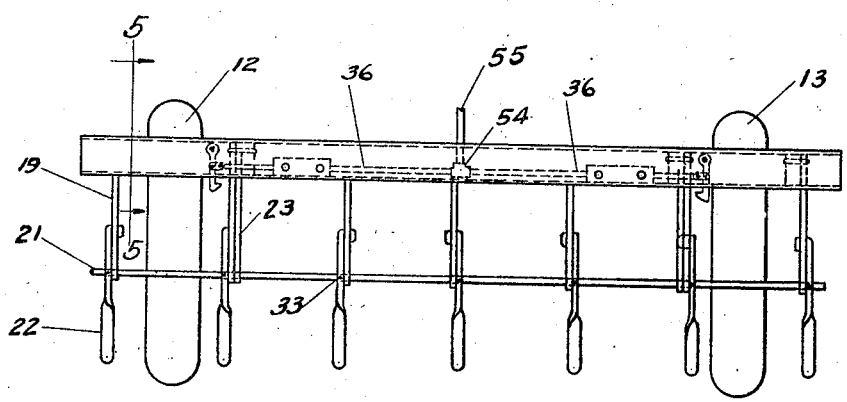
Figure 4:
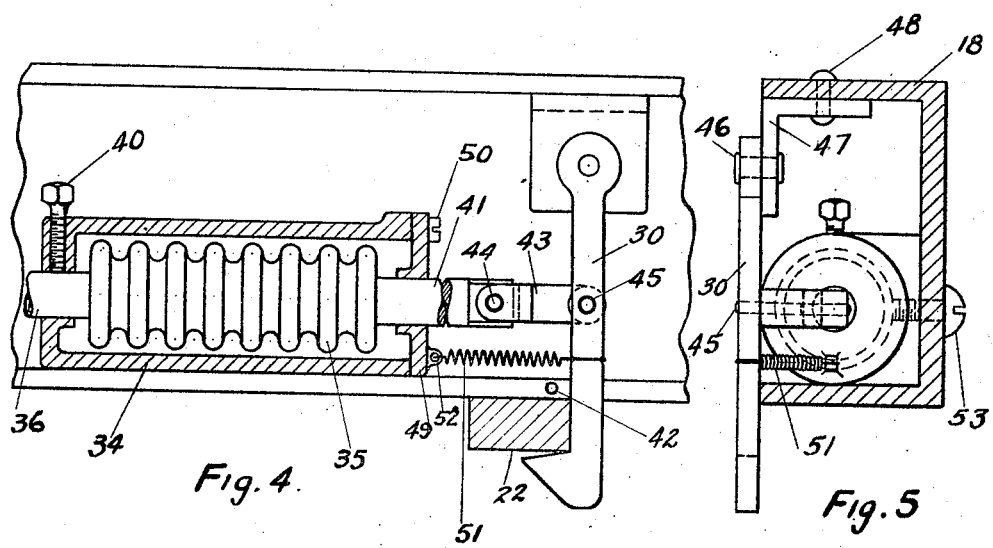
Figure 5:
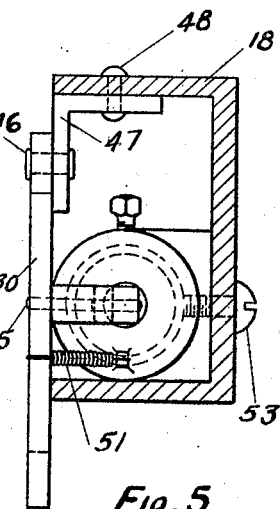

In the accompanying drawings in which is shown one of the various possible embodiments of this invention, Figure 1 is a diagrammatic side elevation of the forward part of a motor vehicle having the fender mounted on the forward part of its frame. Figure 2 is a side elevation of the forward part of the frame of the motor vehicle with the fender mounted thereon, the moving parts of the fender being shown in the retracted or folded up position. Figure 3 is a front elevation of the fender, the fender proper being in an extended position; the two forward wheels of the vehicle which it is designed to protect are shown diagrammatically to give a clear idea as to the arrangement of the fender in regard to the wheels. Figure 4 is an enlarged view of the fender retaining latch and the extensible capsule operating the same; the view being taken from the rear of the fender, shows the mechanism as attached in the channel bumper bar. Figure 5 is an end elevation in cross section of the bumper bar showing the fender retaining latch and the casing containing the extensible capsule, the section being taken along the line 5—5 in the direction as shown by the arrows in Figure 3.

Similar reference characters refer to similar parts throughout in the several views of the drawings.

Turning now to Figure 1 there is shown at 10 a motor vehicle frame having mounted thereon a spring 11 carrying wheels 12 and 13, the rear end of the spring 11 is connected to the frame by the shackle 14 and the bolts such as 15. Mounted upon the forward end of the frame 10 are two fender brackets 16 one on either side of the forward end of the frame which are similar in construction and one only of which is shown in Fig. 1. Fastened across the forward ends of brackets 16 is a bumper bar 18 formed of metal channel bar. A link 19 is swiveled at its upper end upon a pin 20 which is pressed into a boss on the side of the fender bracket 16. The lower end of this link is provided with a slot through which is passed a bar 21 which also passes through holes in the arm 22 and link 23 as shown. The arm 22 is twisted at its lower end so as to present its widest surface to the front and is bent forward at its lowest extremity as shown. The upper end of this arm is bent around so as to form a lug 24 which engages with the back edge of the link 19 when the arm 22 and the link 19 are in line with each other, the lug 24 preventing the arm 22 from swinging out of line about the bar 21 as an axis with link 19 except to the front. The upper end of link 23 is bent at right angles to the left and is provided with a slot 25 which also has a right angle bend in it. This slot engages with the pin 26 fastened into the fender bracket 16. The spring 27, one end of which is hooked about the pin 28 driven into the link 23, the other end being hooked on to a similar pin 29 driven into link 19, tends to hold the linkage in the position as shown in Figure 1 whenever the fender is in an extended position. The link 23 under the urge of the spring 27 is swung about the bar 21 as an axis in a clockwise direction so that the end of the slot 25 engages the pin 26. Thus if pressure be applied to the front side of the fender, the fender will be prevented from springing back about the pin 20 as an axis because of the locking action of the slot 25 and the pin 26 as is readily seen in Figure 1.

Turning now to Figure 2 the fender mechanism which is explained above is shown in the retracted or folded up position. The arm 22 which was the lowest member of the fender when it was extended is now folded up tightly against the bottom of the bumper bar 18 and the stud 59 and is retained securely in this position by means of the latch 30 which hooks under the lower edge of the arm 22 and wedges it up against the bottom of the bumper bar 18. There are two similar fender brackets and fender linkages of the type above described and therefore one only has been described above. Turning now to Figure 3 there is shown a series of parallel links such as 19 the upper ends of which are swiveled upon pins such as 20 pressed into brackets such as 31 which are riveted to the rear side of the bumper bar 18 by means of the rivets such as 32. The lower ends of the links 19 are provided with holes through which a bar 21 is passed. Two of the links such as 19, which are part of the fender supporting linkage as shown in Figure 1, are swiveled about the pins such as 20 which in this case are pressed into bosses on the fender brackets 16. Another series of arms such as 22 is mounted about the bar 21 and is fastened to the bar 21 by means of pins such as 33 so that whenever the bar 21 turns the attached arms such as 22 will also turn as a unit therewith.

Turning now to Figure 4 there is shown a casing 34 enclosing an extensible capsule 35. The left hand end of the capsule 35 is connected with a pipe 36 which passes out through the left hand end of the casing 34 and is conducted along the frame 10 of the motor vehicle to a similar capsule 37 enclosed in a similar casing 38 mounted on the steering column 39. The pipe 36 not only serves as a medium for conducting fluid to and from the extensible capsule 35 but also serves as a support for the end of the capsule 35 the pipe being restrained from relative movement with the casing 34 by means of the set screws 40. Slidably mounted in the other end of the casing 34 is a plunger 41, one end of which bears against the right hand end of the extensible capsule 35 and the other end of which is connected to the latch 42 by means of the link 43 and the pins 44 and 45, the latch 42 being swiveled about the pin 46 which is riveted into a hole in the angle plate 47 which is riveted to the bumper bar 18 by rivets such as 48. The latch 42 being so far off center from the center line of the plunger 41, it is necessary to provide an appreciable boss on one side of it to support the pin 45 where it passes through it. The casing 34 is provided with a cover 49 at one end affording access to its interior, this cover being secured to the casing 34 by means of screws such as 50 threaded into the body of the casing 34. A spring 51, one end of which is hooked over the latch 42, has its other end hooked into a lug 52 integral with the cover plate 49 and at all times holds the plunger 41 up against the end of the capsule 35. The casing 34 is secured to the bumper bar 18 by means of screws such as 53; part of the casing 34 and the cover plate 49 have been broken away to afford a clear and unobstructed view of these screws such as 53 as shown in Figure 5. As there are two similar mechanisms for actuating the latch 30 as above described in reference to Figures 4 and 5, one only has been described but turning to Figure 3 both of these latch actuating mechanisms are shown by the broken lines in the position in which they are mounted on the rear side of the bumper bar 18 and are connected by means of the T connection 54 and the pipe 55 which leads to and is connected to the extensible capsule 37. The extensible capsule 37 is securely fastened in the casing 38 which is mounted on the steering column 39 by reason of one end being fastened to the pipe 55 by brazing or similar process, the pipe 55 itself being fastened to the casing 38 by means of a small set screw 56. A plunger 57 is slidably mounted in the cover 58 which is threaded into the casing 38, and is threaded into a thimble which is brazed to the end of the extensible capsule 37.

The action of the fender mechanism above described is substantially as follows:

Turning now to Figure 1 the fender linkage is shown in the extended position, that is the position in which the fender is thrown by the operator when the operator realizes that he is about to strike an obstruction or a person which happens to be in the path of the vehicle. The fender having fulfilled its purpose it will be usually considered advisable to fold it up out of the way so as to avoid striking stones and other small projections in the roadway. This is accomplished by grasping the lower end of the arm 22 with the hand and at the same time pressing against the bar 21 with the other hand and upon drawing the lower end of the arm 22 in a forward direction the linkage will begin to fold up by reason of the lug on the upper end of arm 22 engaging with the adjacent portion of the link 23 and causing it to swing in a counter-clockwise direction about the bar 21 as a fulcrum until the stud 26 is in line with the straight portion of the slot 25. This unlocking action having been completed the linkage will further fold up until it assumes the position as shown in Figure 2 with the lower end of the arm 22 pressed tightly against the bottom of the bumper bar 18 and securely held there by the latch 30.

Turning to Figure 4 the latch in the actuating mechanism is shown in enlarged scale. It will be seen that the latch 30 is wedged against the arm 22 of the fender whenever the fender is in the retracted position. The latch is provided with an inclined surface where it engages with the arm 22 and thus a wedging action is brought about which tends to hold the arm 22 securely against the bottom of the bumper bar 18. A pin 42 is driven into the edge of the bumper bar 18 to act as a stop for the latch 30 whenever the fender is in an extended position as otherwise the spring 51 would draw it over to the left to such an extent that it would be impossible for the operator to snap the latch 30 to the right by merely forcing the arm 22 up against the bottom of the bumper bar 18. The pin 42 is so set that the motion of the latch 30 to the left is limited to such an extent that whenever the operator draws the arm 22 upwards toward the bumper bar 18 it will engage with the inclined surface of the lower part of the latch 30 and force it to the right.

Having described the action of the fender when it is being folded up after use, we will now consider its action in a reverse condition, that is consider the vehicle approaching an object or a person in its path and the operator desiring to extend the fender to ward off the blow or to prevent the object or person from being carried under the wheels of the vehicle. The operator having made certain that a collision is inevitable, he will at once extend the fender by releasing the latch 30 which will permit the fender to unfold. The fender will unfold itself downward due to its weight tending to draw the linkage downward toward the roadway and also by reason of the spring 27 tending to draw the links 23 and 19 towards each other because of its being hooked over the pins 29 and 28 fastened in the respective links 19 and 23. The linkage will continue to unfold itself until it has reached the position as shown in Figure 1 where it is entirely unfolded or extended. In the extended position the links 19 and arms 22 of the fender proper assume a substantially vertical position and in line with each other and with the lug 24 which is on the upper end of the arm 22 engaging with the rear edge of the link 19 thus enabling the lower edge of the fender to resist any pressure which tends to force it towards the rear. This rearward thrust is taken up by the link 23 which acts as a brace and locks the fender in an extended position by reason of one end of it being fastened to the bar 21 while its upper end which is provided with a slot having a 90° bend engages with the stud 26 in the fender bracket 16.

The releasing of the latch 30 is accomplished by the operator placing his hand upon the knob on the rod 57 and pressing downward upon it. The rod 57 transmits the pressure to the extensible capsule 37 which collapses to a certain extent and as it is filled with a practically incompressible fluid the resulting pressure is transmitted through the pipe 55 to a similar extensible capsule 35 which is mounted in the casing 34 on the bumper bar 18 and is connected to the latch 30 by means of the link 43 and the rod 41 with suitable pins such as 44 and 45 as shown in Figure 4. The extensible capsule 35 will extend due to the pressure transmitted to it through the pipe 55 and its degree of extension will be in proportion to the degree of contraction of the like extensible capsule 37. The action of the extensible capsules 35 and 37 is similar to a bellows, that is by reason of their construction they are able to extend in an axial direction only when subjected to internal pressure. After the latch 30 has been forced over to the right by the extension of the extensible capsule 37 the arm 22 having been released thereby and the fender proper having extended itself completely, the operator may remove his hand from the knob 60 whereupon the knob 60 and the rod 57 will move upwardly along the steering column 39 by reason of the fluid pressure within the extensible capsule 37 causing it to return to its original position. This pressure is due to the spring 51 shown in Figure 4 pulling the latch 30 over against the pin 42 and at the same time compressing the extensible capsule 35 by the link 43 fastened to the latch 30 by the pin 45 and to the rod 41 by the pin 44 driving the rod 41 up against the end of the extensible capsule 35. The resultant pressure is transmitted to the extensible capsule 37 through the pipe 36. After the fender has fulfilled its purpose and the operator desires to return it to the retracted position, he will proceed as previously described. As the fender is designed with the idea that its normal position will be the retracted position the linkage has been designed with the idea in mind of making it as near rattle-proof as possible when in this position.

As various possible embodiments might be made of the above invention, and as various changes might be made in the embodiment above set forth, it is to be understood that all matter herein set forth or shown in the acompanying drawings is to be interpreted as illustrative and not in a limiting sense.

I claim:

1. In fender construction, in combination, a frame mounted in advance of a vehicle having an upper portion and a lower portion adapted to swing rearwardly therebeneath, and means adapted to hold said portions in the position in which they are swung upwardly and swung together.

2. In fender construction, in combination, a frame mounted in advance of the vehicle and adapted to swing downwardly and forwardly in an extended position, said frame comprising a pair of portions joined one to the other and in substantial alignment in extended position, and means adapted to hold said frame in extended position.

3. In fender construction, in combination, a frame comprising a plurality of upright members mounted to swing downwardly in advance of the vehicle and a downward extension pivotally connected with said frame and adapted to fold upwardly beneath the same.

4. In fender construction, in combination, a fender comprising a pair of portions adapted to swing together rearwardly and upwardly into retracted position from an extended position and an inclined brace connected to move automatically into a position in which it braces said fender in extended position against retracting movement.

5. In fender construction, in combination, a fender adapted to move into operative position before a vehicle, means for holding said fender in a retracted position, and fluid-actuated means adapted to release said holding means and allow said fender to move into operative position.

6. In fender construction, in combination, a fender mounted in advance of the vehicle and fluid actuated means adapted to cause said fender to move into operative position, and means actuated by the driver of the vehicle adapted to compress fluid to control said fluid actuated means.

7. In fender construction, in combination, a fender mounted in advance of the vehicle, a fluid responsive device controlling the position of said fender, and a fluid compressing device connected with said first device and mounted adjacent to the driver of the vehicle.

8. In fender construction, in combination, a collapsible frame adapted to extend into a position in advance of the vehicle, a fluid responsive device controlling the extension of said frame, and a fluid compressing device connected with said first device and mounted adjacent to the driver of the vehicle.

9. In fender construction, in combination, a fender mounted in advance of the vehicle, an extensible member controlling the position of said fender, and compressing means actuated by the driver of the vehicle adapted to force air into said extensible member.

10. In fender construction, in combination, a collapsible fender, means for holding said fender in retracted position, and fluid-actuated means adapted to release said holding means and permit said fender to fall into extended position.

11. In fender construction, in combination, a fender mounted before the wheels of a vehicle, a fluid-responsive device controlling the position of said fender, and means operated by the driver adapted to compress fluid to operate said fluid-responsive device.

12. In fender construction, in combination, a collapsible fender mounted before a vehicle, means for holding said fender in retracted position, fluid-actuated means for releasing said fender, and resilient means adapted to move said fender into extended position.

13. In fender construction, in combination, a fender comprising a plurality of substantially vertical parallel arms and means adapted to fold said fender rearwardly and upwardly into inoperative position.

14. In fender construction, in combination, a fender comprising a pair of frames pivoted one to the other and each comprising a plurality of substantially parallel arms and means adapted to permit swinging of said frames rearwardly and upwardly into a folded position.

Signed at Stamford in the county of Fairfield and State of Connecticut.

ROBERT S. BLAIR.